July 7, 1931.  H. J. NEUFANG ET AL  1,813,075
COUPLING DEVICE
Filed Dec. 12, 1930    2 Sheets-Sheet 1

INVENTORS
Henry J. Neufang
William S. Waldo
BY
Edward
their ATTORNEY

INVENTORS
Henry J. Neufang
BY William B. Waldo
their ATTORNEY

Patented July 7, 1931

1,813,075

UNITED STATES PATENT OFFICE

HENRY J. NEUFANG, OF ATLANTA, AND WILLIAM S. WALDO, OF BATAVIA, NEW YORK, ASSIGNORS, BY MESNE ASSIGNMENTS, TO BOGGS PLOW COMPANY, INC., OF ATLANTA, NEW YORK, A CORPORATION OF NEW YORK

COUPLING DEVICE

Application filed December 12, 1930. Serial No. 501,908.

The present invention relates to a coupling device and has for its object to provide an improved device of this class for cooperation with a draft element which may be employed to connect a tractor or other pulling means with various types of farming implements, including plows, harrows, cultivators and the like.

A further object of the invention is to provide an improved coupling device of this class designed for automatic release under excessive or abnormal loads.

A further object of the invention is to provide in a coupling device of the present type improved means by which the coupling element, when released under excessive loads exerted by the pull of the tractor, will be retained in release position to insure automatic recoupling with the tractor when backing it up to a predetermined position with respect to said coupling element.

A further object of the invention is to provide in a coupling device of the self releasing type, means having the double function of holding the coupling element in operating position under normal loads and of retaining it in release position when moved thereto under excessive loads for subsequent return to coupling position by the tractor.

A further object of the invention is to provide a coupling device embodying a simple and practical construction which is efficient in service, and which can be manufactured at relatively low cost.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

Figure 1:
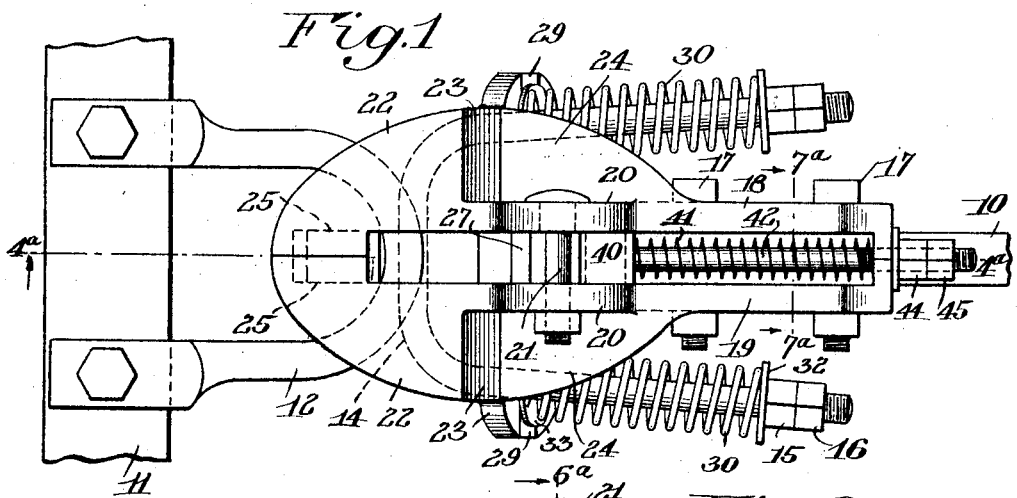
Fig. 1 is a plan view of a coupling device embodying the invention.

Referring to the drawings, 10 represents a draft member which may constitute the draft beam of a plow or that of any other machine or implement with which it may be desired to use the present device.

The draw bar of the tractor is indicated at 11 and mounted thereon is a draft element 12 which is preferably a clevis or U-shaped member suitably attached to the draw bar. A coupling member or lever 13 is adapted to receive the clevis and is mounted to swing upon the central portion of a draft member 14, preferably comprising a yoke or U-shaped member which may be formed by bending a rod and threading its ends to receive the nuts 15 and 16, the latter of which constitute locking nuts for the nuts 15.

Figure 2:
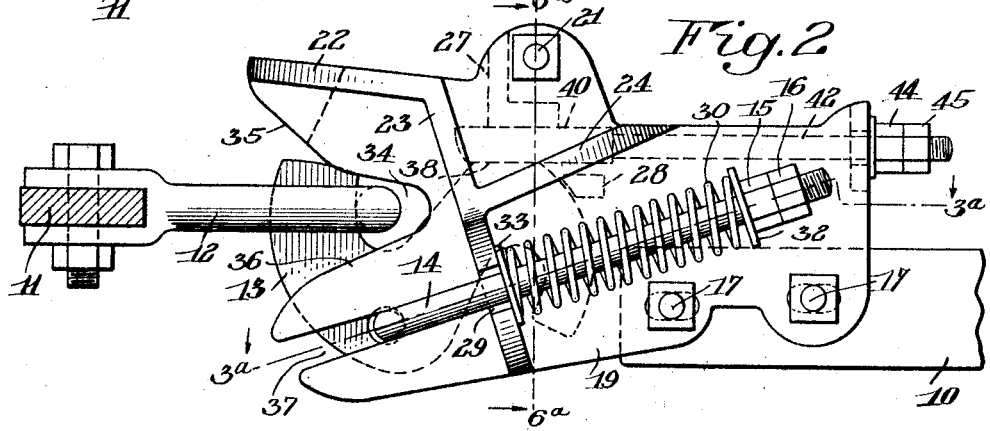
Fig. 2 is a side elevation of the same.
Figure 6:
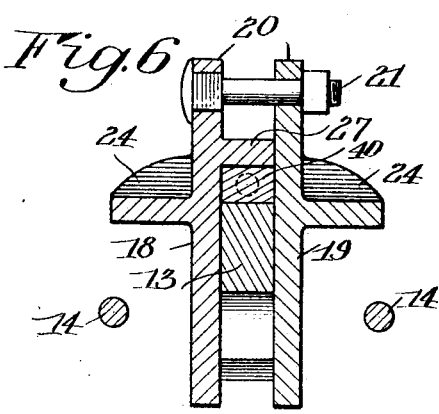
Fig. 6 is a transverse section taken on line 6a—6a of Fig. 2.
Figure 7:
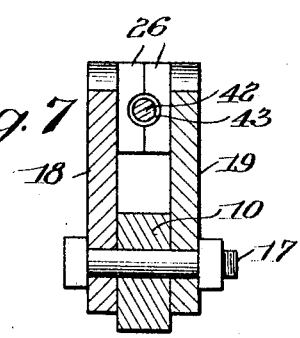
Fig. 7 is a transverse section taken on line 7a—7a of Fig. 1.

Suitably attached to the draft beam 10, as by means of bolts 17 are a pair of frame or bracket members 18 and 19 which preferably comprise separate castings having upstanding lugs 20 connected by a clamping bolt 21 as shown in Figs. 1 and 6, the bolts 17 also forming connecting means for the frames. The frames are provided at their front ends with horizontally disposed reinforcing members 22 forming a continuation of the laterally extending substantially vertical reinforcing plate members 23, from which extend rearwardly the triangular shaped bracing ribs 24 as shown in Figs. 1 and 2. The frames at their front and rear ends are provided with abutting lugs 25 and 26 respectively which are held in engagement one with another by the clamping action of bolts 17 and 21. Intermediate the ends of the frame 18 are a pair of upper and lower lugs 27 and 28 respectively which engage and abut the vertical wall portion of the opposing frame 19 and which, like the lugs 25 and 26, are provided not only as a means for properly spacing the frames apart, but as means for guiding and controlling certain of the operating parts as will appear hereinafter.

Figure 3:
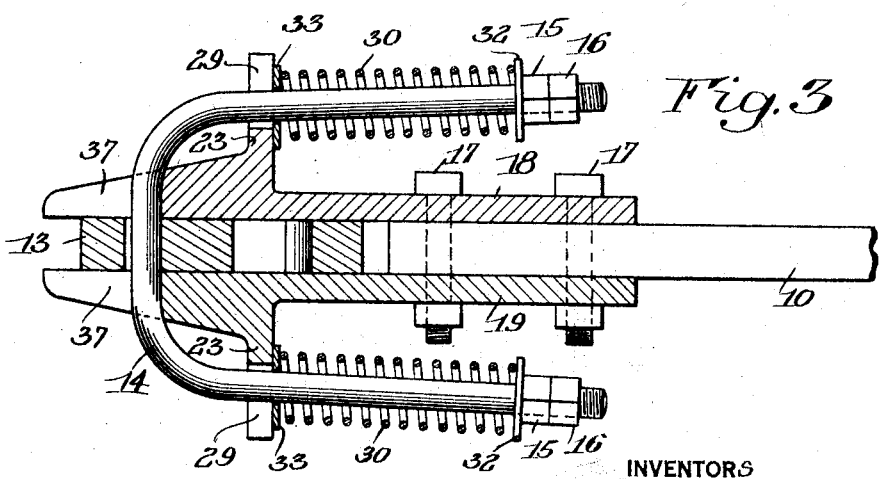
Fig. 3 is a horizontal section taken on line 3a—3a of Fig. 2.

The laterally extending plates 23 are slotted at 29 to receive the side portions of the yoke 14 as best shown in Fig. 3. Springs 30 are mounted on said side portions with their rear ends engaging washers 32 held by the nuts 15 and their front ends engaging washers 33 seated on the plate members 23 as shown in Fig. 3.

The front ends of the frames are cut away to afford a V-shaped opening 34 for the reception of the clevis 12 on the tractor and the upper and lower inclined portions 35 and 36 of the frames serve to direct the clevis into the position shown in Fig. 2 when the tractor is backed up to connect it with the coupling device. The frames are slotted at 37 to receive the transverse portion of the yoke as indicated in Figs. 2 and 3 and when a pull is exerted on the yoke by the tractor the springs 30 will yieldably resist outward movement of the yoke which will be moved ahead bodily within the slots 37 to various positions, depending upon the extent of the load on the coupling lever 13.

The coupling lever is preferably of S-shaped construction and has an upper horizontally disposed shoulder 38 normally in a plane substantially paralleling the line of draft and being above the point of engagement of the clevis with the S-shaped lever. Immediately in rear of the shoulder 38 a curved or cam surface 39 is formed on the coupling lever, the same being provided for a purpose hereinafter set forth.

Figure 4:
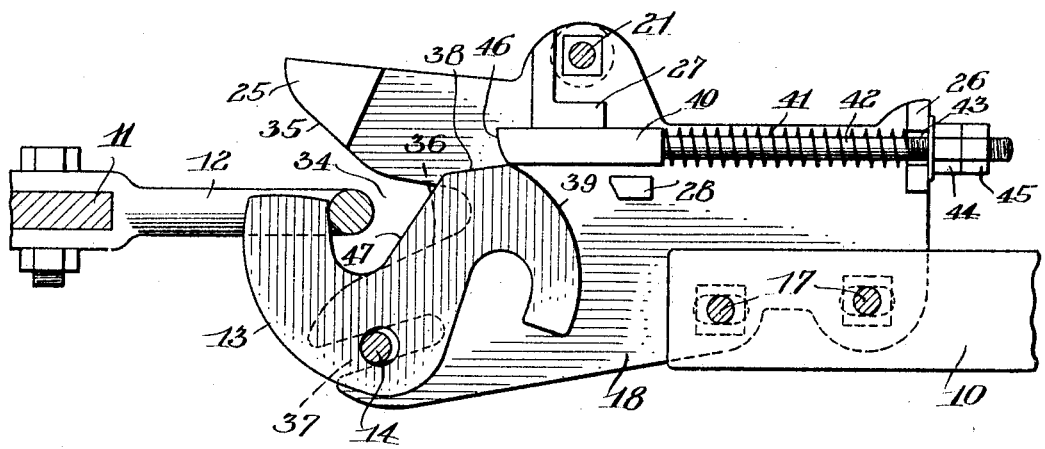
Fig. 4 is a sectional elevation taken substantially on line 4a—4a of Fig. 1 showing the coupling lever in partially released position.

A latch or guard 40, preferably in the form of a plunger, is horizontally disposed above the draft beam 10 and above the line of draft. The guard serves under normal conditions of operation to hold the lever in the operating position shown in Fig. 2, the latch being maintained in said position by a spring 41 surrounding the reduced portion 42 thereof, the spring having its front end engaging the portion 40 of the guard and its rear end seated on the lugs 26 of the frame members, which are recessed at 43 to afford a relatively large opening for the said portion 42 whereby the latch is permitted to have a limited swinging movement between the lugs 27 and 28. The spring 42 serves to hold the guard in the advanced position shown in Fig. 4, which is the normal retaining position for the lever 13. The guard may be advanced or retracted within certain limits by adjusting the nuts 44 and 45 on the rear end thereof, whereby to permit release of the lever 13 under varying loads on the springs 30 and the draft yoke 14. In other words, if the nuts are unscrewed a certain amount to permit the spring 41 to advance the guard to a position ahead of that shown in Fig. 4, greater compression of the springs 30 will be required to permit the draft lever to be moved to release position, or to the position at which the shoulder 38 of the lever will clear the curved portion 46 of the guard. If however, it is desired to adjust the guard so that it will release the lever under a relatively light load, the nuts 44 and 45 will be screwed up to retract the guard the desired amount in order to reduce the extent of outward movement of the lever and the draft yoke, thereby reducing the amount necessary to compress the springs 30 before the shoulder 38 of the lever clears the forward end of the guard, at which time the lever will swing from the position shown in Fig. 4 to that shown in Fig. 5 to effect release of the clevis 12.

Figure 5:
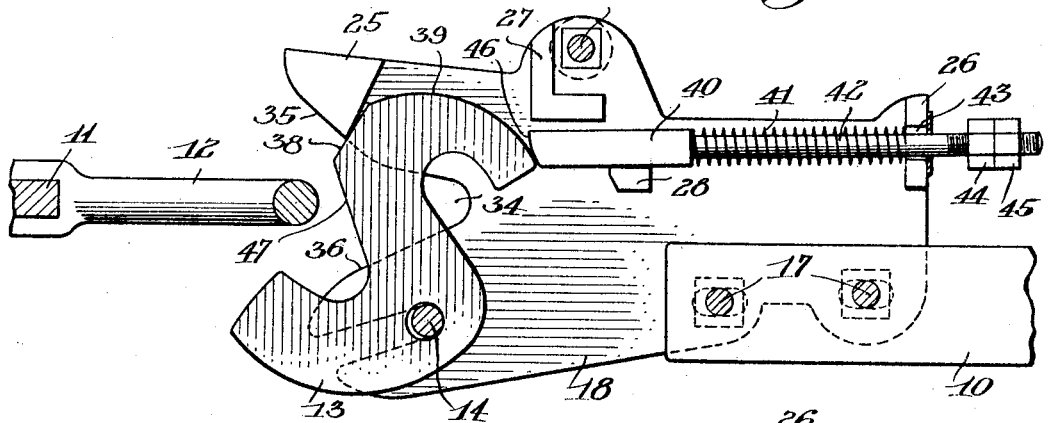
Fig. 5 is a similar view showing the coupling lever moved to extreme release position.

An important feature of this construction is that the guard, through engagement with the extremity of the cam portion 39 of the lever serves to hold the lever in position to be reset by the clevis on the tractor when the clevis is moved into engagement with the middle portion 47 of the lever, assuming that the lever is in the release position shown in Fig. 5. In this position the spring pressed guard serves to urge the shoulder 38 of the lever into engagement with the lugs 25 of the frame members 18 and 19. In moving the lever from the partially released position shown in Fig. 4 to the full release position shown in Fig. 5, the cam portion 39 will move in engagement with the end portion 46 of the guard and as soon as the clevis is released by the guard the latter is retracted by the yoke and while being swung to the position shown in Fig. 5 the guard is pushed back and the spring 41 further compressed, thus insuring sufficient tension therein to hold the lever in the released position shown in Fig. 5. However, the curve of the cam is such that while the lever is moving from release to coupling position or from the position shown in Fig. 5, it will move the guard rearwardly from the position shown in this figure and further compress the spring 41 which will result in a quickening movement of the guard in returning to normal position subsequent to the passage of the cam face from engagement with the end of the guard. It will be understood that under normal operating conditions, with the lever and draft yoke moving back and forth under varying loads that the shoulder 38 of the lever will travel back and forth in engagement with the guard which is held against upward displacement by the lug 27 and that only under a predetermined abnormal load will the springs 30 be sufficiently compressed to permit the lever to advance to the position shown in Fig. 4 where it is about to be released. It will be understood that the guard is guided by the lugs 27 and 28 and also by the inner faces of the frames and has a sliding movement between one extreme position and another. The distance between the lugs 27 and 28 is somewhat greater than the depth of the guard to permit the latter to have a slight pivotal movement whereby to facilitate operation of the parts.

We claim as our invention:

1. In a coupling device for tractors and the like, a frame, a coupling lever movable upon the frame, means yieldably resisting movement of the lever, a guard for the lever, the lever being movable upon the guard to a predetermined release position under an abnormal load, a part on the frame for limiting the movement of the lever subsequent to release thereof and yieldable means operating after release of the lever to hold the guard in position to urge the lever in engagement with said part.

2. In a coupling device for tractors and the like, a frame, a coupling lever movable upon the frame, means yieldably resisting movement of the lever, a spring pressed plunger forming a guard for the lever, spaced guides for the guard, said lever being movable upon the guard to a predetermined release position under an abnormal load, and a part on the frame for limiting the movement of the lever subsequent to release thereof, said lever when released being automatically retracted by said yieldable means during which time the plunger operates to move a portion of the lever into engagement with said part whereby the lever is conditioned for recoupling with the draft element of the tractor.

3. In a coupling device, a frame, a draft member bodily movable upon the frame, means yieldably resisting movement of the draft member, a coupling lever mounted to swing on the draft member and arranged for connection with a draft element for exerting a pull on the lever whereby to advance both the lever and the draft member, a guard for the lever arranged to release the same after bodily movement thereof to a predetermined position by the draft element, and means arranged to yieldably urge the guard in engagement with the lever after release thereof whereby to hold the lever in release position.

4. In a coupling device, a frame, a draft member bodily movable upon the frame, means yieldably resisting movement of the draft member, a coupling lever mounted to swing on the draft member and arranged for connection with a draft element for exerting a pull on the lever whereby to advance both the lever and the draft member, a guard for the lever arranged to release the same after bodily movement thereof to a predetermined position by the draft element, a part on the frame for limiting the swinging movement of the lever when released and spring means arranged to yieldably urge the guard in engagement with said part upon release of the lever, said spring means also operating to return the guard to normal operating position upon return of the lever to normal position.

5. In a coupling device, a frame, a draft member bodily movable upon the frame arranged to be guided in its movement thereby, means yieldably resisting movement of the draft member, a coupling member arranged for connection with the draft element of a tractor and adapted to be moved bodily thereby to a predetermined position under an abnormal load and to effect bodily movement of the draft member, a guard for the coupling member arranged to release the latter when it is moved to said predetermined position, and means arranged to yieldably urge the guard against the coupling member when released whereby to hold it in position to be returned to normal coupling position by the draft element upon backing up the tractor to a predetermined position with respect to the frame.

6. A coupling device for tractors and the like comprising a frame, a draft member bodily movable upon the frame, means yieldably resisting movement of the draft member, a coupling member movable relative to and operatively associated with said draft member and arranged to be coupled with the draft element of a tractor, said coupling member when in coupling position having a portion horizontally disposed, a guard normally overlying and engaging said horizontal portion, a part on the frame for resisting upward movement of the guard, and spring means normally holding the guard in extended position upon the horizontal portion of said coupling member, said coupling member operating when released to move the guard rearwardly against the resistance of said spring means whereby the pressure exerted by the guard on the coupling member will hold the latter in position to be recoupled with said draft element.

7. A coupling device for tractors and the like comprising a frame, a draft member bodily movable upon the frame, means yieldably resisting movement of the draft member, a coupling member movable relative to and operatively associated with the draft member and arranged to be coupled with the draft element of the tractor, a guard normally in extended position for holding the coupling member against movement relative to the draft member while permitting it to move upon the guard, spring means for holding the guard in said extended position, the coupling member under an abnormal load being moved to a position at which it will be released by the guard, said member when released being free to move relative to the draft member and being automatically retracted by the latter under the pressure exerted by said yieldable means, said coupling member during retraction operating to displace the guard and arranged to be held by the latter under the pressure of said spring means in position for recoupling with the draft element of the tractor.

8. A coupling device for tractors and the like comprising a frame arranged for attachment to a machine to be drawn by the tractor, a draft member bodily movable upon the frame, means yieldably resisting movement of the draft member, a coupling member movable relative to and operatively associated with the draft member and arranged to be coupled with the draft element of the tractor, said coupling member having a cam portion thereon, a substantially horizontal guard normally in extended position for holding the coupling member against movement relative to the draft member while permitting it to move upon the guard, upper and lower supporting members for the guard, spring means for holding the guard in said extended position, the coupling member under an abnormal load being moved to a position at which it will be released by the guard, said member when released being free to move relative to the draft member and being automatically retracted by the latter under the pressure exerted by said yieldable means, the cam portion of said coupling member during retraction operating to displace the guard and arranged to be held by the latter under the pressure of said spring means in position for recoupling with the draft element on the tractor.

9. A coupling device for tractors and the like comprising a frame arranged for attachment to a draft beam, a draft member bodily movable upon the frame, means yieldably resisting movement of the draft member, a bodily movable coupling lever pivoted upon and operatively associated with the draft member and arranged for connection with the draft element of the tractor, a guard normally in extended position for holding the lever against pivotal movement while permitting bodily movement thereof, spring means for holding the guard in said position, the lever under an abnormal load being moved to a position at which it will be released by the guard, said lever and draft member when released being automatically retracted by said yieldable means and the lever operating during retraction to displace the guard against the resistance of said spring means whereby the guard will operate to hold the lever in position to receive and to be returned to coupling position by said draft element, said spring means operating subsequent to recoupling of the lever to return the guard to said extended position.

10. In a device of the class described, a draft beam, a pair of frames secured upon said beam and extending forwardly thereof said frames having front and rear lugs serving to space them apart and having laterally extending draft lugs thereon, a U-shaped yoke guided by said frames and movable longitudinally thereof, springs arranged to be compressed by the yoke against said draft lugs, a coupling lever pivoted between the frames upon the transverse portion of the yoke, said lever having a front portion arranged for connection with a draft element and having a rear portion provided with a shoulder, a guard for the lever engaging said shoulder to resist pivotal movement of the lever under the action of the draft element and upper and lower supporting lugs for the guard extending between said frame members.

HENRY J. NEUFANG.
WILLIAM S. WALDO.